United States Patent
Hofer et al.

(10) Patent No.: US 10,657,952 B2
(45) Date of Patent: May 19, 2020

(54) SCORE TREND ANALYSIS FOR REDUCED LATENCY AUTOMATIC SPEECH RECOGNITION

(71) Applicant: Intel IP Corporation, Santa Clara, CA (US)

(72) Inventors: Joachim Hofer, Munich (DE); Georg Stemmer, Munich (DE); Josef G. Bauer, Munich (DE); Munir Nikolai Alexander Georges, Kehl (DE)

(73) Assignee: Intel IP Corporation, Santa Clara, CA (US)

( * ) Notice: Subject to any disclaimer, the term of this patent is extended or adjusted under 35 U.S.C. 154(b) by 204 days.

(21) Appl. No.: 15/892,510

(22) Filed: Feb. 9, 2018

(65) Prior Publication Data
US 2019/0043476 A1 Feb. 7, 2019

(51) Int. Cl.
*G10L 15/01* (2013.01)
*G10L 15/22* (2006.01)
(Continued)

(52) U.S. Cl.
CPC .............. *G10L 15/01* (2013.01); *G10L 15/05* (2013.01); *G10L 15/16* (2013.01); *G10L 15/22* (2013.01);
(Continued)

(58) Field of Classification Search
CPC ................................. G10L 15/01; G10L 15/05
See application file for complete search history.

(56) References Cited

U.S. PATENT DOCUMENTS 7,031,923 B1 * 4/2006 Chaudhari ............ G10L 15/187
704/235
7,136,710 B1 * 11/2006 Hoffberg ............... G06F 3/0482
700/83

(Continued)

OTHER PUBLICATIONS

Maas et al., Domain-Specific Utterance End-Point Detection for Speech Recognition, INTERSPEECH 2017, Stockholm, Aug. 24, 2017, https://www.isca-speech.org/archive/Interspeech_2017/pdfs/1673, DOI: 10.21437/Interspeech.2017, 5 pages.

(Continued)

*Primary Examiner* — Michael N Opsasnick
(74) *Attorney, Agent, or Firm* — Finch & Maloney PLLC (57) ABSTRACT

Techniques are provided for reducing the latency of automatic speech recognition using hypothesis score trend analysis. A methodology implementing the techniques according to an embodiment includes generating complete-phrase hypotheses and partial-phrase hypotheses, along with associated likelihood scores, based on a segment of speech. The method also includes selecting the complete-phrase hypothesis associated with the highest of the complete-phrase hypotheses likelihood scores, and selecting the partial-phrase hypothesis associated with the highest of the partial-phrase hypotheses likelihood scores. The method further includes calculating a relative likelihood score based on a ratio of the likelihood score associated with the selected complete-phrase hypothesis to the likelihood score associated with the selected partial-phrase hypothesis. The method further includes calculating a trend of the relative likelihood score as a function of time and identifying an endpoint of the speech based on a determination that the trend does not decrease over a selected time period.

20 Claims, 8 Drawing Sheets

(51) Int. Cl.
*G10L 15/05* (2013.01)
*G10L 15/16* (2006.01)
*G10L 25/87* (2013.01)
*G10L 15/14* (2006.01)

(52) U.S. Cl.
CPC .............. *G10L 25/87* (2013.01); *G10L 15/14* (2013.01); *G10L 2015/223* (2013.01)

(56) References Cited

U.S. PATENT DOCUMENTS

| | | | |
|---|---|---|---|
| 7,555,431 B2 * | 6/2009 | Bennett | G06F 17/27 704/255 |
| 7,624,007 B2 * | 11/2009 | Bennett | G06F 17/27 704/9 |
| 7,672,841 B2 * | 3/2010 | Bennett | G06F 17/27 704/215 |
| 9,457,959 B2 * | 10/2016 | Menke | B65G 17/08 |
| 9,818,400 B2 * | 11/2017 | Paulik | G10L 15/02 |
| 2007/0016476 A1 * | 1/2007 | Hoffberg | G05B 15/02 705/14.64 |
| 2008/0270120 A1 * | 10/2008 | Pestian | G06F 17/2785 704/9 |
| 2008/0270138 A1 * | 10/2008 | Knight | G10L 15/26 704/260 |
| 2010/0324896 A1 | 12/2010 | Attwater et al. | |
| 2016/0379632 A1 | 12/2016 | Hoffmeister et al. | |
| 2017/0323638 A1 | 11/2017 | Malinowski et al. | |

OTHER PUBLICATIONS

Chang et al., Endpoint Detection using Grid Long Short-Term Memory Networks for Streaming Speech Recognition, INTERSPEECH 2017, Stockholm, Aug. 24, 2017, pp. 3812-3816.

International Search Report for International Patent Application No. PCT/US2019/012171, dated Apr. 26, 2019, 3 pages.

International Written Opinion for International Patent Application No. PCT/US2019/012171, dated Apr. 26, 2019, 5 pages.

* cited by examiner

SCORE TREND ANALYSIS FOR REDUCED LATENCY AUTOMATIC SPEECH RECOGNITION

BACKGROUND

Human-machine interfaces that employ language understanding systems are becoming increasingly popular. These systems are configured to recognize a command spoken by the user and provide an appropriate response to the command. One important characteristic of these systems, which affects the quality of the user experience, is latency (i.e., the length of time taken by the system to respond to the user input). One significant factor contributing to latency is the ability to detect the end of the user's speech utterance in connection with speech recognition. One approach to speech endpoint detection relies on voice activity detection based on the presence of signal energy. If voice activity (voice signal energy) is not detected for a predefined period of time, an assumption is made that the user has stopped talking. This technique does not work well, however, in noisy environments where background noise can be misrecognized as voice signal energy, resulting in a failure to detect the endpoint, which can cause the system to become unresponsive. Another approach to speech endpoint detection is to declare an endpoint after a predefined period of time has elapsed in which the best hypothesis of the speech recognizer has not changed. This technique, however, requires that the predefined period of time is long enough to guarantee that the longest possible phrase can be spoken, which also increases system latency.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts.

Although the following Detailed Description will proceed with reference being made to illustrative embodiments, many alternatives, modifications, and variations thereof will be apparent in light of this disclosure.

DETAILED DESCRIPTION

Generally, this disclosure provides techniques for reduced latency automatic speech recognition (ASR). The techniques employ speech endpoint detection based on score trend analysis of one or more ASR hypotheses. The time required for an ASR processor to generate a recognition result, generally referred to herein as the ASR latency, can be significantly impacted by the time needed to determine the endpoint of the user's speech. Making a speech endpoint recognition decision prior to receiving and processing a sufficient quantity of speech may increase the error rate (with respect to falsely declaring an endpoint). Waiting too long, however, to be sure that the user has finished speaking, can result in excessive latency. Reducing latency while maintaining a desirable error rate improves the user's interaction experience with the system. The disclosed techniques track the probabilities, or likelihood scores, of ASR generated hypotheses over time, as additional user speech is received, and determine a speech endpoint based on trends in the ratios of these scores, as will be explained in greater detail below.

The disclosed techniques can be implemented, for example, in a computing system or a software product executable or otherwise controllable by such systems, although other embodiments will be apparent. The system or product is configured to reduce the latency of automatic speech recognition using hypothesis score trend analysis. In accordance with an embodiment, a methodology to implement these techniques includes generating complete-phrase hypotheses and partial-phrase hypotheses, along with associated likelihood scores, based on a segment of speech. The method then continues with selecting the complete-phrase hypothesis associated with the highest of the complete-phrase hypotheses likelihood scores, and selecting the partial-phrase hypothesis associated with the highest of the partial-phrase hypotheses likelihood scores. The method further includes calculating a relative likelihood score based on a ratio of the likelihood score associated with the selected complete-phrase hypothesis to the likelihood score associated with the selected partial-phrase hypothesis. The method further includes calculating a trend of the relative likelihood score as a function of time, as additional speech is collected and processed, and identifying an endpoint of the speech based on a determination that the trend does not decrease over a period of time. The period of time is selected as a tradeoff between latency and error rate.

As will be appreciated, the techniques described herein may allow for an improved user experience with a language understanding system, by providing more responsive performance (e.g., faster response to user inputs, queries, and commands) compared to existing methods that employ ASR processors with relatively long latencies prior to the generation of recognition results. The disclosed techniques can be implemented on a broad range of platforms including laptops, tablets, smart phones, workstations, video conferencing systems, gaming systems, smart home control systems, and embedded systems or devices. These techniques may further be implemented in hardware or software or a combination thereof. Numerous applications that call for or otherwise entail interactive communication between a computing platform and a user, or between participants in a given computer-monitored conversation or exchange can benefit from the techniques provided, as will be appreciated.

Figure 1:
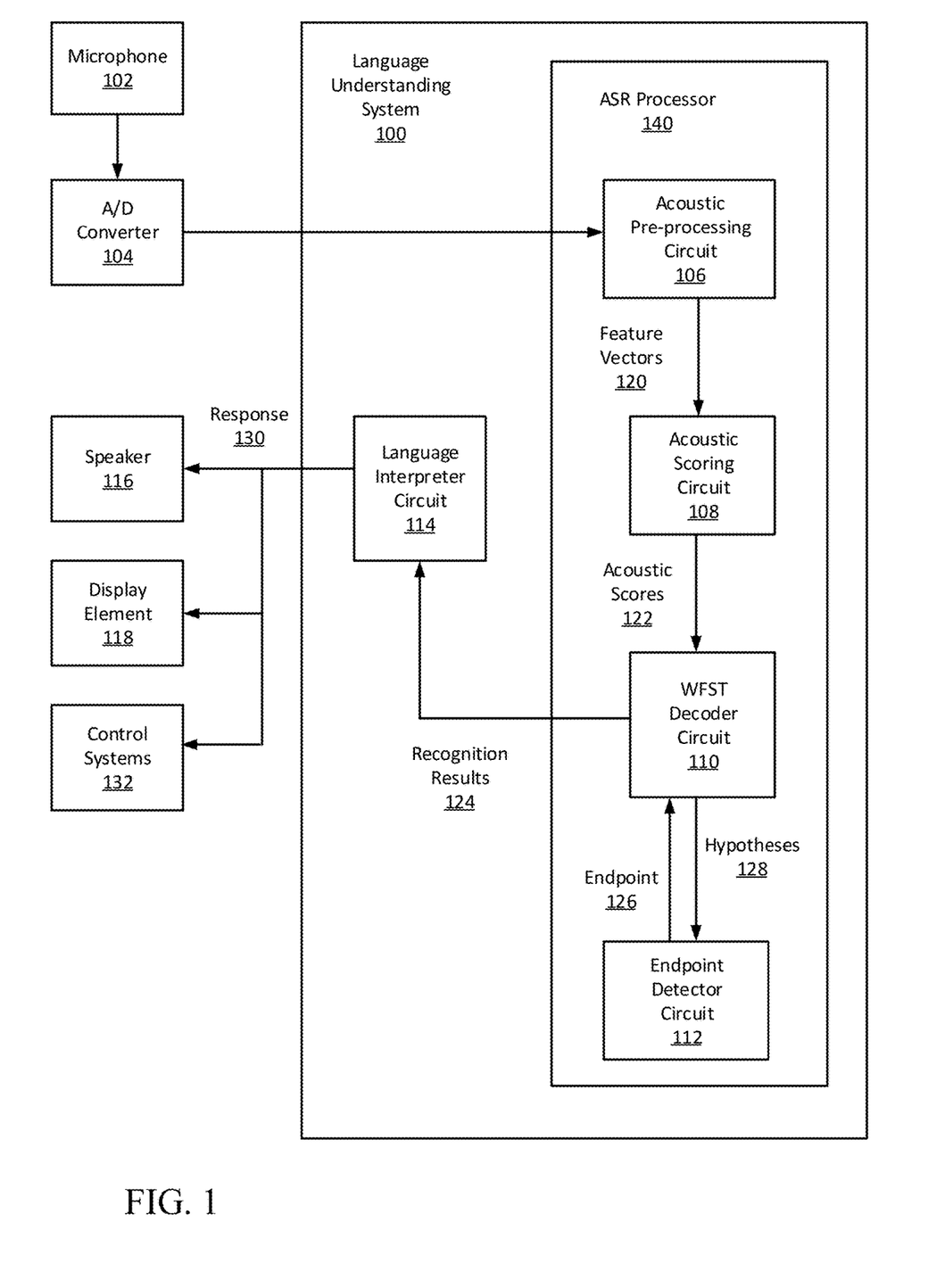
FIG. 1 is a block diagram of a language understanding system with reduced latency ASR (automatic speech recognition), configured in accordance with certain embodiments of the present disclosure.

FIG. 1 is a block diagram of a language understanding system 100 with reduced latency ASR, configured in accordance with certain embodiments of the present disclosure. The language understanding system 100 is shown to include an ASR processor 140 and a language interpreter circuit 114. The ASR processor is further shown to include an acoustic pre-processing circuit 106, an acoustic scoring circuit 108, a weighted finite state transducer (WFST) decoder circuit 110, and an endpoint detector circuit 112. Additionally, input elements including microphone 102 and A/D converter 104, are shown, along with output elements speaker 116, display element 118, and control systems 132. In some embodiments, the language understanding system 100, and one or more input/output elements, may be hosted on a computing or communications platform, as described in greater detail in connection with FIG. 8 below.

Audio input, including speech from a user of the system, may be provided by microphone 102, or an array of microphones (e.g., configured for beamforming), or any other suitable audio capture device. The analog audio input signal from the microphone is converted to a digital signal by A/D converter 104, and provided to the ASR processor 140 to perform reduced latency speech recognition on the signal.

Acoustic pre-processing circuit 106 is configured to partition the audio signal into windowed segments and generate feature vectors 120 for each segment, using known techniques in light of the present disclosure.

Acoustic scoring circuit 108 is configured to operate on the feature vectors 120 and generate acoustic scores 122 for phonetic units of the speech, using known techniques in light of the present disclosure. In some embodiments, the acoustic scoring circuit 108 may be implemented as a deep neural network or a recursive neural network. The phonetic unit acoustic scores 122 are provided to the WFST decoder circuit 110 to determine the most likely spoken utterance from the user.

WFST decoder circuit 110 is configured to generate speech recognition hypotheses 128 including one or more complete-phrase hypotheses and one or more partial-phrase hypotheses from a current segment of user speech. Each of the complete-phrase hypotheses and partial-phrase hypotheses are associated with a probability or likelihood score. The best hypotheses have the highest likelihood scores. The WFST decoder circuit 110 may employ known techniques in light of the present disclosure to generate these hypotheses. As additional speech is obtained, the hypotheses are updated. Some new hypotheses may be added, some existing hypotheses may be dropped, and likelihood scores may change. When the speech endpoint is detected, as will be described below, the current best complete-phrase hypothesis may be chosen as the ASR result and provided to the language interpreter circuit 114.

Language interpreter circuit 114 is configured to generate a response to the ASR result. In some embodiments, the response may be an audio response delivered through speaker 116, a visual response delivered through display element 118, and/or an action response of some type delivered through one or more control systems 132. The action response may include execution of a requested command associated with the ASR result. For example, the command "lock doors" may result in an audio confirmation from the system such as "locking doors now," accompanied by the action of locking the doors through appropriate control system hardware.

In situations where there are relatively few possible (e.g., valid) utterances for a command and control task, or if the user speaks relatively long words, it may take some time for the best hypothesis to change. For example, consider a task that has two commands: "Turn the lights off," and "Turn the lights off in the kitchen." If the user speaks the second command, then from the point when the received speech includes "Turn the lights off . . . " until the point when the received speech includes "Turn the lights off in the . . . ," the first result may have the best current score. If the wait time for the endpoint detection is short, the first command hypothesis will become the recognized speech and the second (correct) hypothesis will be discarded. Note that the score of the complete-phrase hypothesis for the first command may be lower than the score of the partial-phrase hypothesis for the second command for most of the processing time, but this does not result in a change of the current best hypothesis.

To address this problem, the endpoint detector circuit 112 is configured to determine an appropriate endpoint for the speech recognition process without requiring an excessively long wait time which can increase latency to undesirable levels. At a high level, the endpoint detector circuit tracks the likelihood scores of the complete-phrase and partial-phrase hypotheses over time, as additional user speech is received, and determines a speech endpoint based on trends of ratios of the highest of these scores. The operation of the endpoint detector circuit 112 will be explained in greater detail below in connection with FIGS. 3-5.

Figure 2:
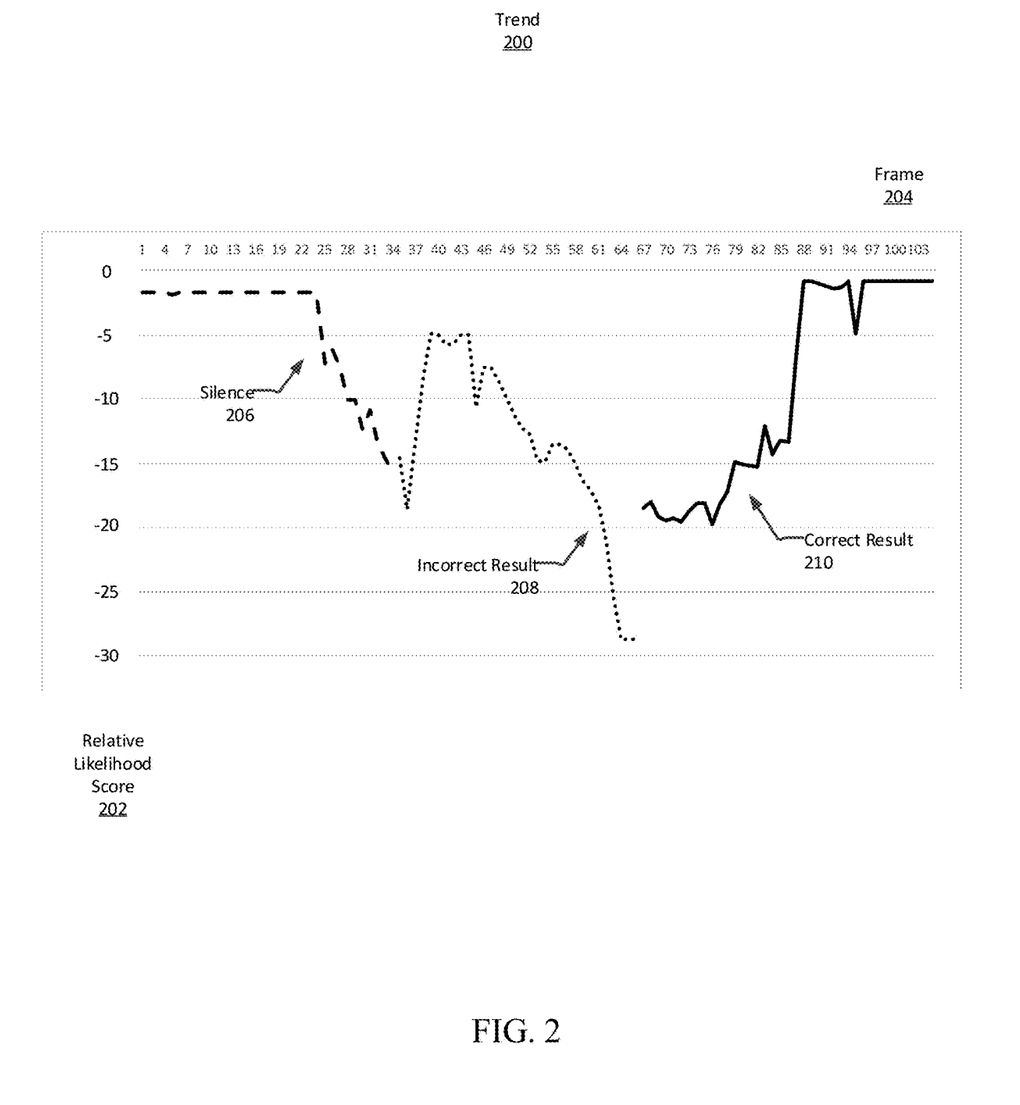
FIG. 2 is a plot of relative likelihood score trends with respect to speech endpoint detection, in accordance with certain embodiments of the present disclosure.

FIG. 2 is a plot 200 of relative likelihood score trends with respect to speech endpoint detection, in accordance with certain embodiments of the present disclosure. The relative likelihood score 202 is expressed on a logarithmic scale on the vertical axis, versus time (in units of 30 millisecond frames) on the horizontal axis. In some embodiments, the relative likelihood score, RL Score, can be expressed as:

$$RL\ Score = \log(\text{best complete phrase hypo score}/\text{best partial-phrase hypo score})$$

Thus, the highest relative likelihood score of zero indicates that the best complete-phrase hypothesis score is equal to the best partial-phrase hypothesis score, while lower relative likelihood scores indicate that the best complete-phrase hypothesis is declining in quality compared to the best partial-phrase hypothesis. In the example illustrated in FIG. 2, the audio signal begins with a period of silence until, at frame 24, the user starts speaking. This causes a partial-phrase hypothesis to have a better score than the silence hypothesis, however the silence hypothesis 206 remains the best complete-phrase hypothesis until frame 34. At that time, a short phrase (for example, "Turn the lights off," as in the earlier example) becomes the best current (although incorrect) hypothesis 208. Until frame 44 the short phrase has the best score compared to other partial-phrase hypotheses. As the user continues speaking, however, the score of that short phrase decreases until frame 67, at which point the current best hypothesis changes to the correct result 210 (e.g., "Turn the lights off in the kitchen"). So, between frames 34 and 67 (which represents almost one second of speech), the best result did not change even though the user continued to speak. Thus, a latency of one second would be required to achieve a correct recognition result for this example without use of the disclosed latency reduction techniques, as described below. Said differently, a decision to use the best hypothesis with less than one second of latency would result in the selection of the incorrect short phrase "Turn the lights off," rather than the correct full phrase "Turn the lights off in the kitchen." FIG. 2 illustrates that the relative likelihood score of the incorrect result generally decreases over time whereas the relative likelihood score of the correct result either improves or remains relatively constant.

Figure 3:
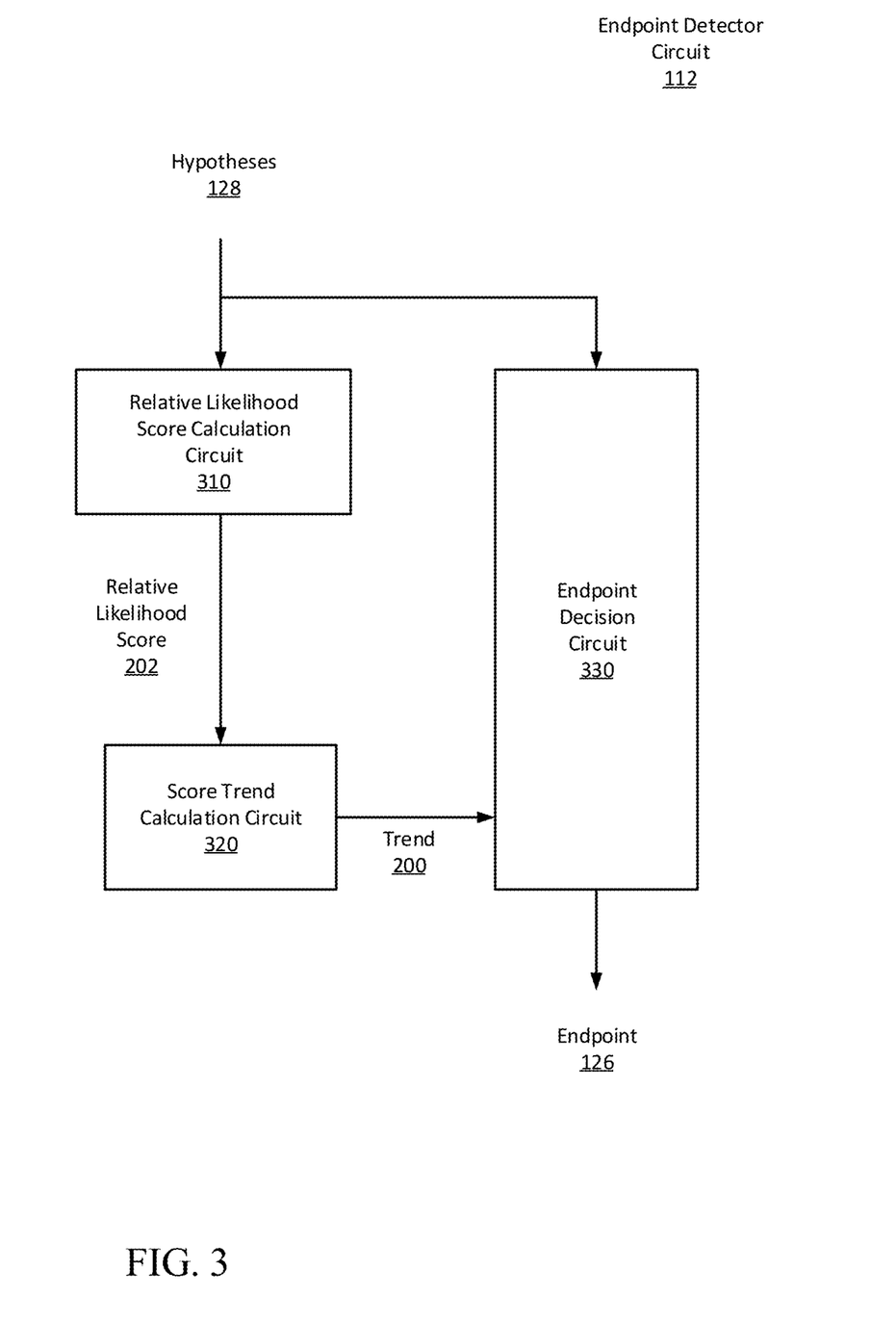
FIG. 3 is a block diagram of an endpoint detector circuit, configured in accordance with certain embodiments of the present disclosure.

FIG. 3 is a block diagram of endpoint detector circuit 112, configured in accordance with certain embodiments of the present disclosure. The endpoint detector circuit 112 is shown to include a relative likelihood score calculation circuit 310, a score trend calculation circuit 320, and an endpoint decision circuit 330. Complete-phrase and partial-phrase hypotheses 128 are provided by the WFST decoder circuit 110 over a period of time, as an initial segment of speech, and additional segments of speech, are received and processed. For example, in some embodiments hypotheses may be generated and provided for each frame of speech audio data.

Relative likelihood score calculation circuit 310 is configured to select the complete-phrase hypothesis associated with the highest of the complete-phrase hypotheses likelihood scores at the current point in time (or frame of speech data), and to select the partial-phrase hypothesis associated with the highest of the partial-phrase hypotheses likelihood scores at that same point in time. The current relative likelihood score 202 is calculated as the ratio of the likelihood score associated with the selected complete-phrase hypothesis to the likelihood score associated with the selected partial-phrase hypothesis. A sequence of these relative likelihood scores 202 (e.g., for each frame) are provided to the score trend calculation circuit 320.

Figure 4:
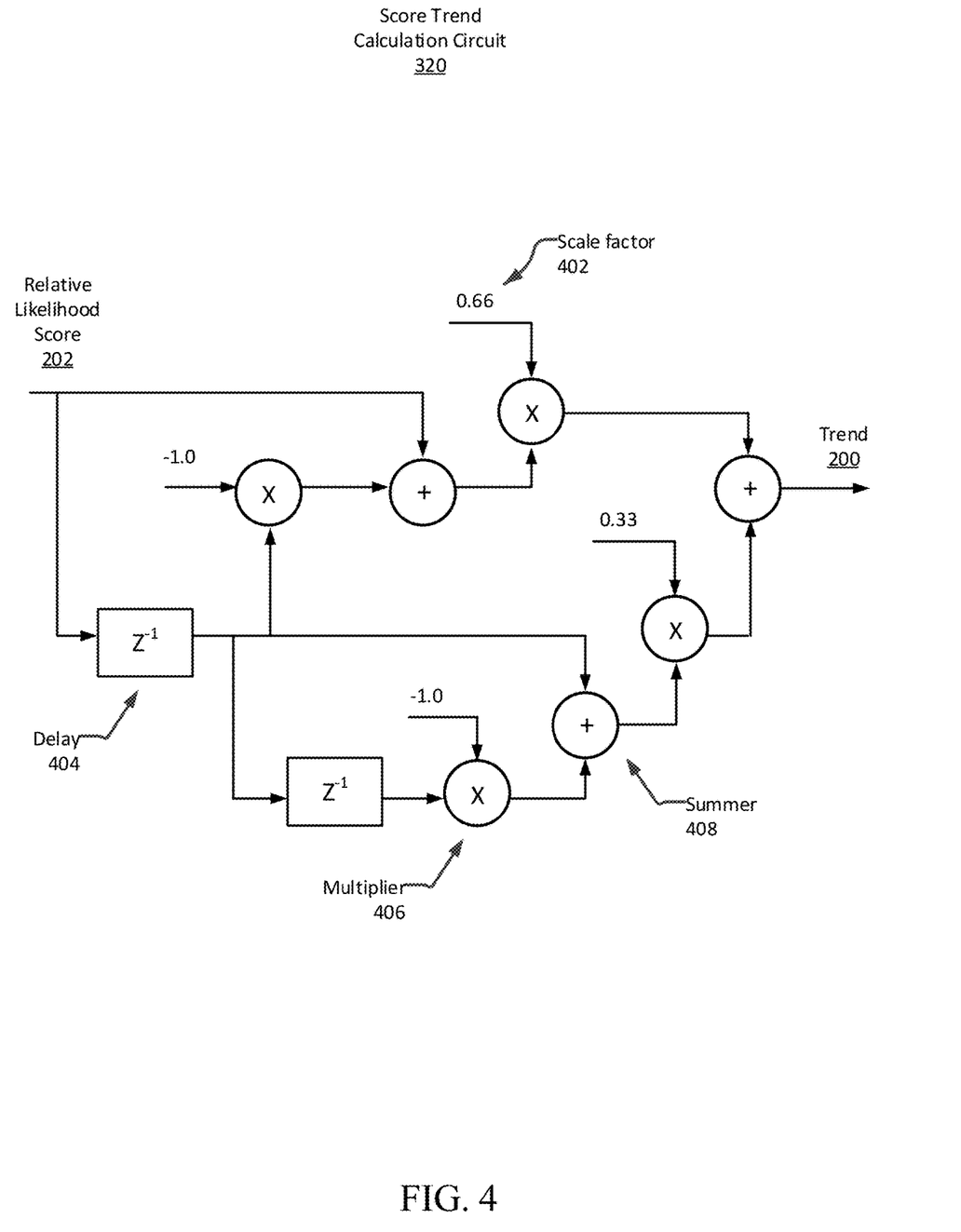
FIG. 4 is a block diagram of a score trend calculation circuit, configured in accordance with certain embodiments of the present disclosure.

FIG. 4 is a block diagram of score trend calculation circuit 320, configured in accordance with certain embodiments of the present disclosure. In some embodiments, score trend calculation circuit 320 is configured to calculate differences between time samples of the relative likelihood scores 202 and apply a low pass filter to the sequence of the calculated differences. For example, score trend calculation circuit 320 is shown to include a network of delay elements 404, multipliers 406, scale factors 402, and summers 408 which are arranged in a circuit configured to calculate a trend 200 of the relative likelihood score as a function of time (e.g., sequential frame number). The trend 200 calculated by this circuit can be expressed by the following equation:

$$\text{trend}(t) = \frac{2}{3}(RL\ \text{score}(t) - RL\ \text{score}(t-1)) + \frac{1}{3}(RL\ \text{score}(t-1) - RL\ \text{score}(t-2))$$

Of course, this is just one example, and different filters can be used to approximate the trend of the relative likelihood score.

Figure 5:
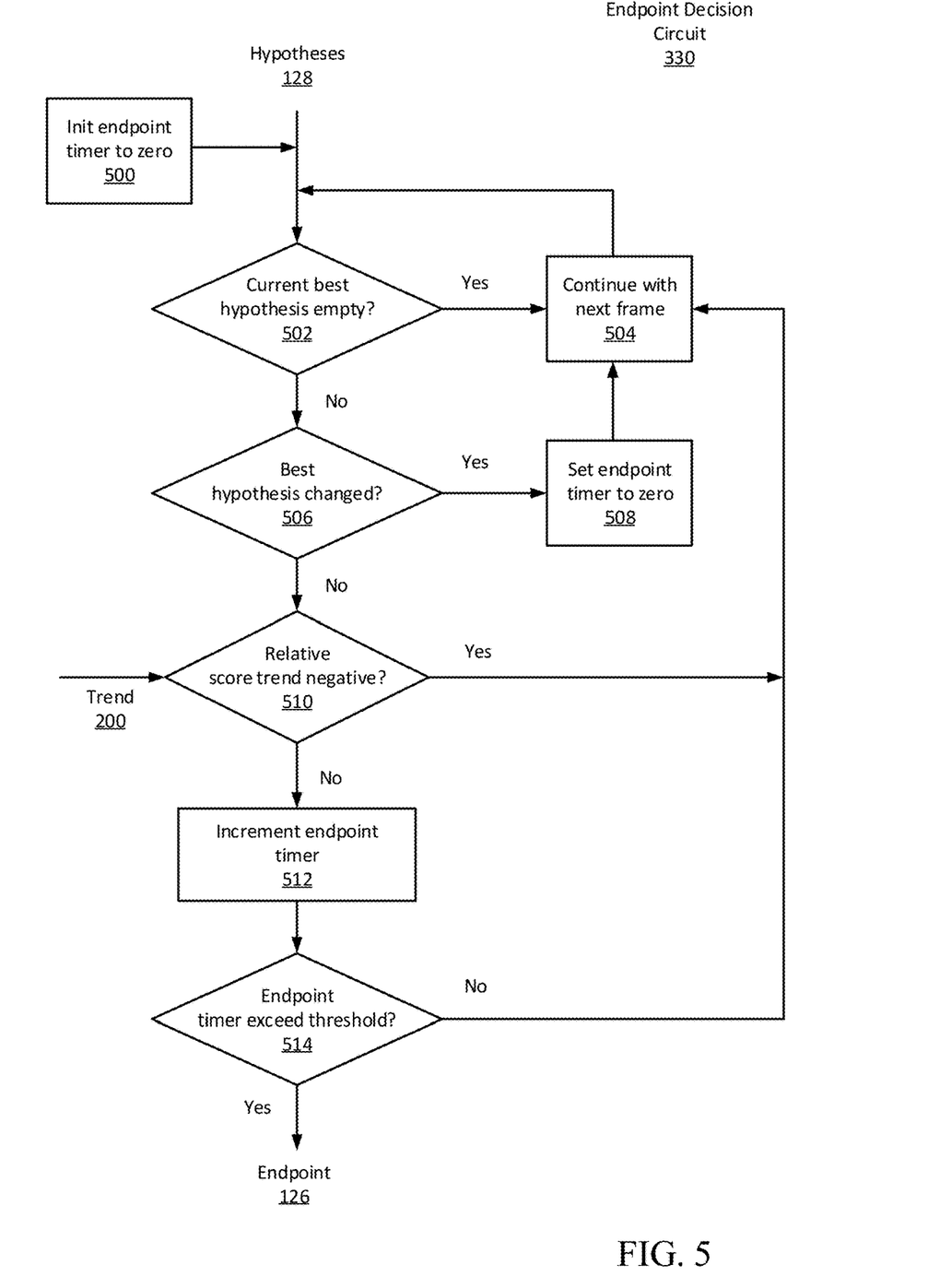
FIG. 5 is a flowchart illustrating an example methodology for speech endpoint determination, in accordance with certain embodiments of the present disclosure.

FIG. 5 is a flowchart illustrating an example methodology for the operation of endpoint decision circuit 330, in accordance with certain embodiments of the present disclosure. The endpoint decision circuit 330 is configured to identify an endpoint of the speech based on a determination of an increase in the trend 200 (or that the trend remains constant) over a selected time period. In some embodiments, the selected time period is chosen to provide a desired ASR error rate.

At operation 500, an endpoint timer is initialized to zero. At operation 502, if a current best hypothesis has not yet been formed, then at operation 504 the WFST decoder circuit continues processing with the next frame of speech data. At operation 506, if the best hypothesis has changed since the previous frame, then the endpoint timer is reset to zero at operation 508, and the WFST decoder circuit continues processing with the next frame of speech data. Otherwise, at operation 510 if the relative score trend 200 is negative, then the WFST decoder circuit continues processing with the next frame of speech data at operation 504. If, however, the relative score trend is not negative (e.g., positive or constant), then the endpoint timer is incremented at operation 512. If the endpoint timer has exceeded a selected threshold, at operation 514, then an endpoint indicator 126 is generated and provided back to the WFST decoder circuit. Otherwise, the WFST decoder circuit continues processing with the next frame of speech data. The selected endpoint timer threshold, using this technique, will generally allow for a shorter latency compared to other methods.

Figure 6:
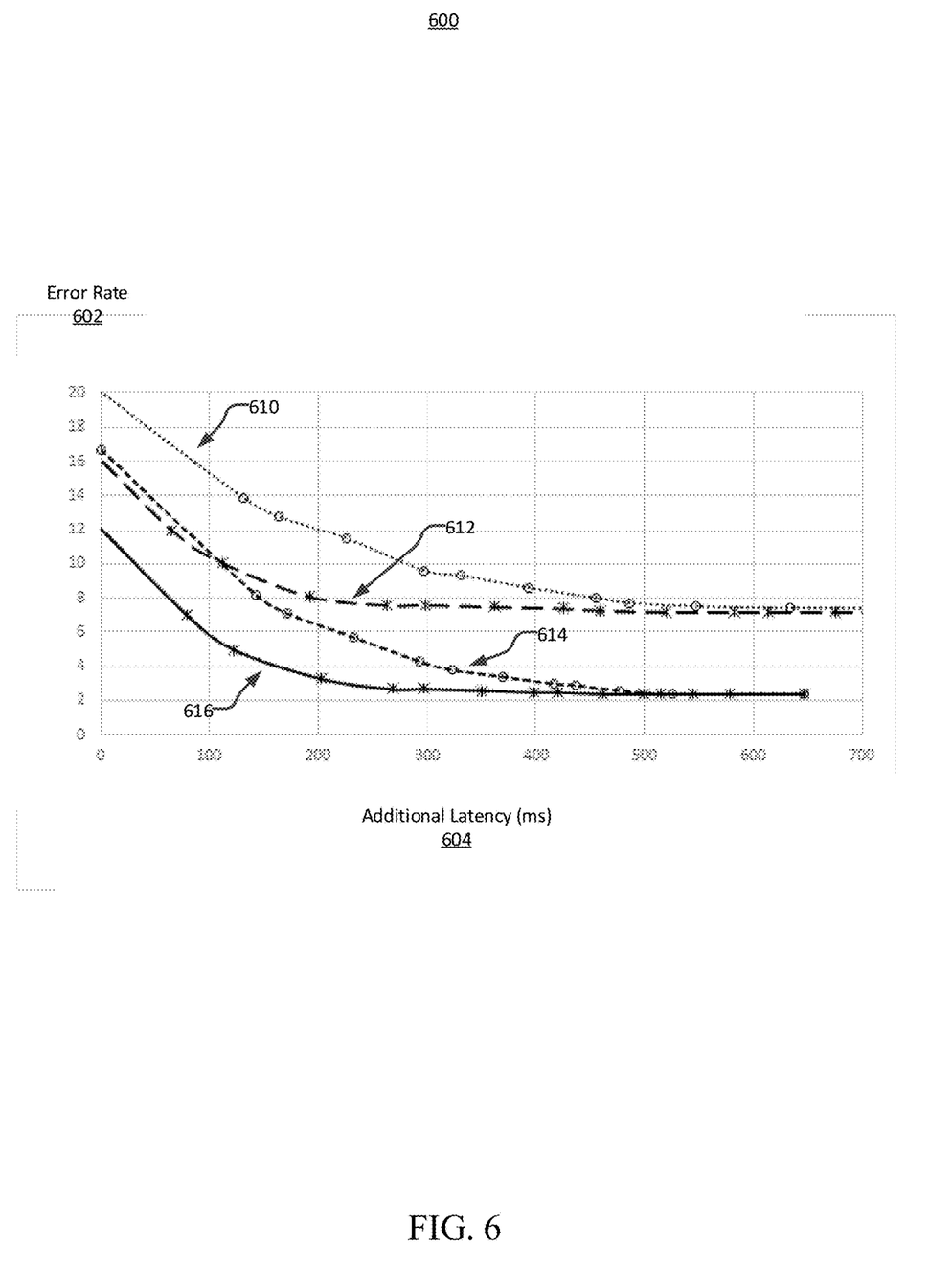
FIG. 6 is a comparative plot of error rates versus latency with respect to speech endpoint detection, in accordance with certain embodiments of the present disclosure.

FIG. 6 is a comparative plot 600 of error rates versus latency, in accordance with certain embodiments of the present disclosure. The error rates are expressed as a percentage along the vertical axis and the latency is expressed in milliseconds along the horizontal axis. Four plots are shown which illustrate the trade-off between latency and recognition accuracy. Plot 614 shows the result of ASR processing on noise free data, without the use of the disclosed techniques. In comparison, plot 616 shows the result of ASR processing on noise free data, using the disclosed latency reduction techniques.

Plot 610 shows the result of ASR processing on noisy data, without the use of the disclosed techniques. In comparison, plot 612 shows the result of ASR processing on noisy data, using the disclosed latency reduction techniques.

From these plots it can be seen that use of the disclosed techniques provides for a reduction in latency from about 500 milliseconds (msec) down to about 300 msec (the point at which the error rates stabilize).

Methodology

Figure 7:
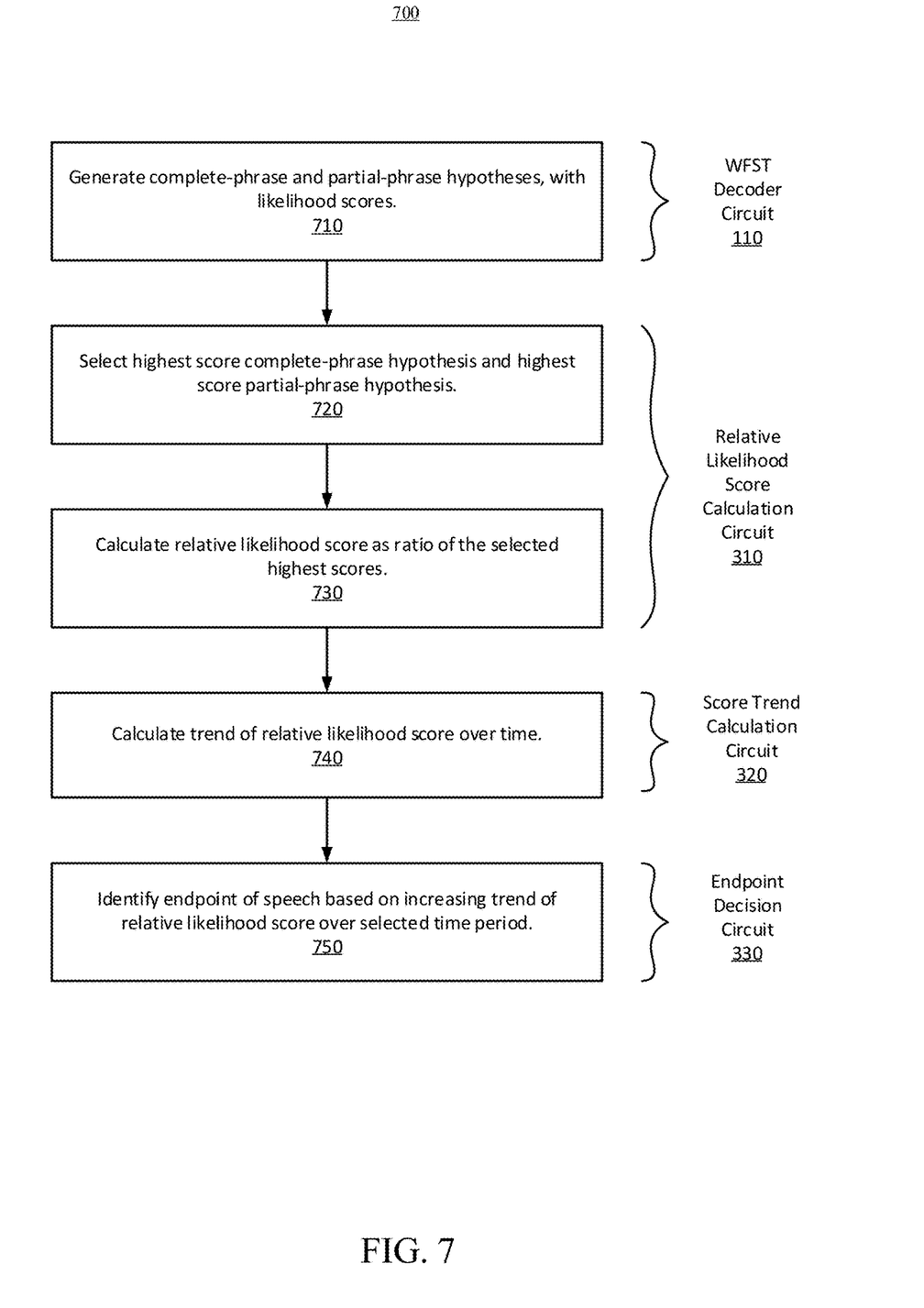
FIG. 7 is a flowchart illustrating a methodology for reduced latency automatic speech recognition, in accordance with certain embodiments of the present disclosure.

FIG. 7 is a flowchart illustrating an example method 700 for reduced latency automatic speech recognition, in accordance with certain embodiments of the present disclosure. As can be seen, the example method includes a number of phases and sub-processes, the sequence of which may vary from one embodiment to another. However, when considered in the aggregate, these phases and sub-processes form a process for reduced latency ASR, in accordance with certain of the embodiments disclosed herein. These embodiments can be implemented, for example using the system architecture illustrated in FIGS. 1, and 3-5 as described above. However other system architectures can be used in other embodiments, as will be apparent in light of this disclosure. To this end, the correlation of the various functions shown in FIG. 7 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 700. Thus, other embodiments may have fewer or more modules and/or sub-modules depending on the granularity of implementation. In still other embodiments, the methodology depicted can be implemented as a computer program product including one or more non-transitory machine-readable mediums that when executed by one or more processors cause the methodology to be carried out. Numerous variations and alternative configurations will be apparent in light of this disclosure.

As illustrated in FIG. 7, in an embodiment, method 700 for reduced latency ASR commences by generating, at operation 710, one or more complete-phrase hypotheses and one or more partial-phrase hypotheses from a segment of speech. Each hypothesis is associated with a likelihood score. The length of the segment of speech is the current duration of the spoken utterance, for example from the user of the system. Next, at operation 720, the highest scoring complete-phrase hypothesis and the highest scoring partial-phrase hypothesis are selected.

At operation 730, a relative likelihood score is calculated based on a ratio of the likelihood score associated with the selected complete-phrase hypothesis to the likelihood score associated with the selected partial-phrase hypothesis.

At operation 740, a trend of the relative likelihood score is calculated as a function of time, for example as existing hypotheses are updated and new hypotheses are generated, as the user continues to speak. In some embodiments, the trend calculation includes calculating differences between time samples of the relative likelihood score and applying a low pass filter (e.g., a smoothing filter) to the time sequence of the calculated differences.

At operation 750, an endpoint of the speech is identified based on a determination that the trend of the relative likelihood score does not decrease over a selected time. In some embodiments, the selected time period is chosen to provide a desired ASR error rate. In some embodiments, in response to identifying the endpoint of the speech, the selected complete-phrase hypothesis (the complete-phrase hypothesis associated with the highest score) is provided as an ASR result.

Of course, in some embodiments, additional operations may be performed, as previously described in connection with the system. For example, a response to the ASR result may be generated by a language interpreter circuit. The response may include execution of a requested command associated with the ASR result. In some embodiments, the complete-phrase hypotheses and the partial-phrase hypotheses are generated by a weighted finite state transducer (WFST) decoder.

Example System

Figure 8:
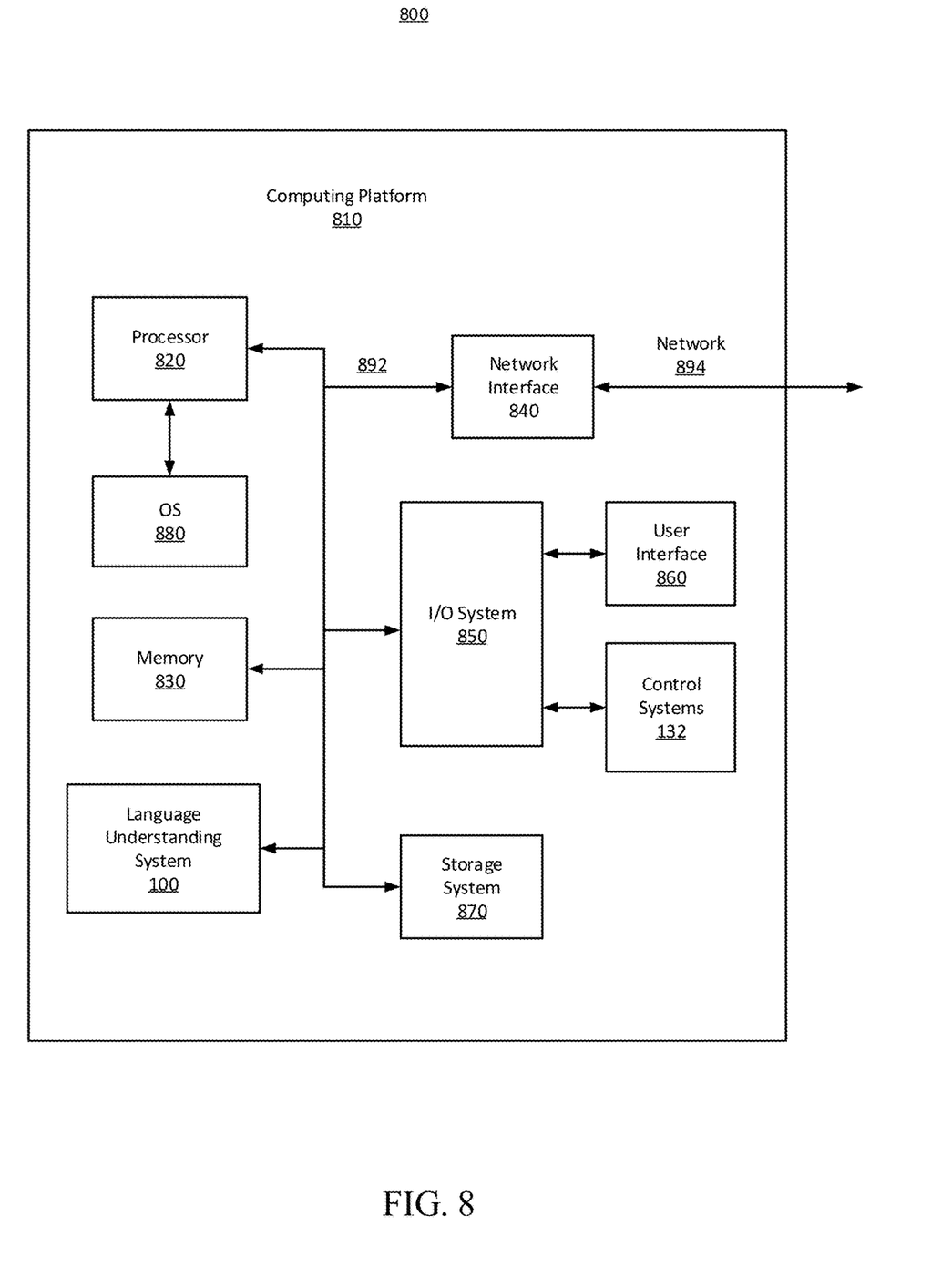
FIG. 8 is a block diagram schematically illustrating a computing platform configured to perform reduced latency automatic speech recognition, in accordance with certain embodiments of the present disclosure.

FIG. 8 illustrates an example system 800 to perform reduced latency ASR, configured in accordance with certain embodiments of the present disclosure. In some embodiments, system 800 comprises a computing platform 810 which may host, or otherwise be incorporated into a personal computer, workstation, server system, smart home management system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, wearable device, embedded system, and so forth. Any combination of different devices may be used in certain embodiments.

In some embodiments, platform 810 may comprise any combination of a processor 820, a memory 830, a language understanding system 100, a network interface 840, an input/output (I/O) system 850, a user interface 860, control system 132, and a storage system 870. As can be further seen, a bus and/or interconnect 892 is also provided to allow for communication between the various components listed above and/or other components not shown. Platform 810 can be coupled to a network 894 through network interface 840 to allow for communications with other computing devices, platforms, devices to be controlled, or other resources. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor, a graphics processing unit, or hardware accelerator, to assist in control and processing operations associated with system 800. In some embodiments, the processor 820 may be implemented as any number of processor cores. The processor (or processor cores) may be any type of processor, such as, for example, a microprocessor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor. In some embodiments, processor 820 may be configured as an x86 instruction set compatible processor.

Memory 830 can be implemented using any suitable type of digital storage including, for example, flash memory and/or random-access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included.

Processor 820 may be configured to execute an Operating System (OS) 880 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with system 800, and therefore may also be implemented using any suitable existing or subsequently-developed platform.

Network interface circuit 840 can be any appropriate network chip or chipset which allows for wired and/or wireless connection between other components of computer system 800 and/or network 894, thereby enabling system 800 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of computer system 800. I/O devices may include, but not be limited to, user interface 860 and control systems 132. User interface 860 may include devices (not shown) such as microphone 102, speaker 116, display element 118, touchpad, keyboard, and mouse, etc. I/O system 850 may include a graphics subsystem configured to perform processing of images for rendering on the display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 820 or any chipset of platform 810.

It will be appreciated that in some embodiments, the various components of the system 800 may be combined or integrated in a system-on-a-chip (SoC) architecture. In some embodiments, the components may be hardware components, firmware components, software components or any suitable combination of hardware, firmware or software.

Language understanding system 100 is configured to provide reduced latency automatic speech recognition for improved response to user commands, as described previously. Language understanding system 100 may include any or all of the circuits/components illustrated in FIGS. 1, and 3-5, as described above. These components can be implemented or otherwise used in conjunction with a variety of suitable software and/or hardware that is coupled to or that otherwise forms a part of platform 810. These components can additionally or alternatively be implemented or otherwise used in conjunction with user I/O devices that are capable of providing information to, and receiving information and commands from, a user.

In some embodiments, these circuits may be installed local to system 800, as shown in the example embodiment of FIG. 8. Alternatively, system 800 can be implemented in a client-server arrangement wherein at least some functionality associated with these circuits is provided to system 800 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 894 or remotely coupled to network 894 by one or more other networks and/or communication channels. In some cases, access to resources on a given network or computing system may require credentials such as usernames, passwords, and/or compliance with any other suitable security mechanism.

In various embodiments, system 800 may be implemented as a wireless system, a wired system, or a combination of both. When implemented as a wireless system, system 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the reduced latency ASR methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 894. In other embodiments, the functionalities disclosed herein can be incorporated into other speech-based software applications, such as, for example, automobile control/navigation, smart-home management, entertainment, and robotic applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments system 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smart phones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for reduced latency automatic speech recognition (ASR), the method comprising: generating, by a processor-based system, one or more complete-phrase hypotheses from a segment of speech, each complete-phrase hypothesis associated with a likelihood score; generating, by the processor-based system, one or more partial-phrase hypotheses from the segment of speech, each partial-phrase hypothesis associated with a likelihood score; selecting, by the processor-based system, one of the complete-phrase hypotheses associated with a highest of the complete-phrase hypotheses likelihood scores; selecting, by the processor-based system, one of the partial-phrase hypotheses associated with a highest of the partial-phrase hypotheses likelihood scores; calculating, by the processor-based system, a relative likelihood score based on a ratio of the likelihood score associated with the selected complete-phrase hypothesis to the likelihood score associated with the selected partial-phrase hypothesis; calculating, by the processor-based system, a trend of the relative likelihood score as a function of time; and identifying, by the processor-based system, an endpoint of the speech based on a determination that the trend does not decrease over a selected time period.

Example 2 includes the subject matter of Example 1, further comprising providing the selected complete-phrase hypothesis as an ASR result in response to identifying the endpoint of the speech.

Example 3 includes the subject matter of Examples 1 or 2, further comprising generating, by a language interpreter circuit, a response to the ASR result, the response including execution of a requested command associated with the ASR result.

Example 4 includes the subject matter of any of Examples 1-3, wherein the trend calculation further comprises calculating differences between time samples of the relative likelihood score and applying a low pass filter to a time sequence of the calculated differences.

Example 5 includes the subject matter of any of Examples 1-4, wherein the selected time period is chosen to provide a desired ASR error rate.

Example 6 includes the subject matter of any of Examples 1-5, wherein the complete-phrase hypotheses and the partial-phrase hypotheses are generated by a weighted finite state transducer (WFST) decoder.

Example 7 includes the subject matter of any of Examples 1-6, further comprising generating, by a neural network, acoustic scores of phonetic units of the speech, for use by the WFST decoder.

Example 8 is a system for reduced latency automatic speech recognition (ASR), the system comprising: a weighted finite state transducer (WFST) decoder circuit to generate one or more complete-phrase hypotheses from a segment of speech, each complete-phrase hypothesis associated with a likelihood score; the WFST decoder circuit further to generate one or more partial-phrase hypotheses from the segment of speech, each partial-phrase hypothesis associated with a likelihood score; a relative likelihood score calculation circuit to select one of the complete-phrase hypotheses associated with a highest of the complete-phrase hypotheses likelihood scores, and to select one of the partial-phrase hypotheses associated with a highest of the partial-phrase hypotheses likelihood scores; the relative likelihood score calculation circuit further to calculate a relative likelihood score based on a ratio of the likelihood score associated with the selected complete-phrase hypothesis to the likelihood score associated with the selected partial-phrase hypothesis; a score trend calculation circuit to calculate a trend of the relative likelihood score as a function of time; and an endpoint decision circuit to identify an endpoint of the speech based on a determination that the trend does not decrease over a selected time period.

Example 9 includes the subject matter of Example 8, wherein the WFST decoder circuit is further to provide the selected complete-phrase hypothesis as an ASR result in response to the identification of the endpoint of the speech.

Example 10 includes the subject matter of Examples 8 or 9, further comprising a language interpreter circuit to generate a response to the ASR result, the response including execution of a requested command associated with the ASR result.

Example 11 includes the subject matter of any of Examples 8-10, wherein the trend calculation further comprises calculating differences between time samples of the relative likelihood score and applying a low pass filter to a time sequence of the calculated differences.

Example 12 includes the subject matter of any of Examples 8-11, wherein the selected time period is chosen to provide a desired ASR error rate.

Example 13 includes the subject matter of any of Examples 8-12, further comprising a neural network to generate acoustic scores of phonetic units of the speech for use by the WFST decoder.

Example 14 is at least one non-transitory computer readable storage medium having instructions encoded thereon that, when executed by one or more processors, result in the following operations for reduced latency automatic speech recognition (ASR), the operations comprising: generating one or more complete-phrase hypotheses from a segment of speech, each complete-phrase hypothesis associated with a likelihood score; generating one or more partial-phrase hypotheses from the segment of speech, each partial-phrase hypothesis associated with a likelihood score; selecting one of the complete-phrase hypotheses associated with a highest of the complete-phrase hypotheses likelihood scores; selecting one of the partial-phrase hypotheses associated with a highest of the partial-phrase hypotheses likelihood scores; calculating a relative likelihood score based on a ratio of the likelihood score associated with the selected complete-phrase hypothesis to the likelihood score associated with the selected partial-phrase hypothesis; calculating a trend of the relative likelihood score as a function of time; and identifying an endpoint of the speech based on a determination that the trend does not decrease over a selected time period.

Example 15 includes the subject matter of Example 14, further comprising the operation of providing the selected complete-phrase hypothesis as an ASR result in response to identifying the endpoint of the speech.

Example 16 includes the subject matter of Examples 14 or 15, further comprising the operation of generating, by a language interpreter circuit, a response to the ASR result, the response including execution of a requested command associated with the ASR result.

Example 17 includes the subject matter of any of Examples 14-16, wherein the trend calculation further comprises the operations of calculating differences between time samples of the relative likelihood score and applying a low pass filter to a time sequence of the calculated differences.

Example 18 includes the subject matter of any of Examples 14-17, wherein the selected time period is chosen to provide a desired ASR error rate.

Example 19 includes the subject matter of any of Examples 14-18, wherein the complete-phrase hypotheses and the partial-phrase hypotheses are generated by a weighted finite state transducer (WFST) decoder.

Example 20 includes the subject matter of any of Examples 14-19, further comprising the operation of generating, by a neural network, acoustic scores of phonetic units of the speech, for use by the WFST decoder.

Example 21 is a system for reduced latency automatic speech recognition (ASR), the system comprising: means for generating one or more complete-phrase hypotheses from a segment of speech, each complete-phrase hypothesis associated with a likelihood score; means for generating one or more partial-phrase hypotheses from the segment of speech, each partial-phrase hypothesis associated with a likelihood score; means for selecting one of the complete-phrase hypotheses associated with a highest of the complete-phrase hypotheses likelihood scores; means for selecting one of the partial-phrase hypotheses associated with a highest of the partial-phrase hypotheses likelihood scores; means for calculating a relative likelihood score based on a ratio of the likelihood score associated with the selected complete-phrase hypothesis to the likelihood score associated with the selected partial-phrase hypothesis; means for calculating a trend of the relative likelihood score as a function of time; and means for identifying an endpoint of the speech based on a determination that the trend does not decrease over a selected time period.

Example 22 includes the subject matter of Example 21, further comprising means for providing the selected complete-phrase hypothesis as an ASR result in response to identifying the endpoint of the speech.

Example 23 includes the subject matter of Examples 21 or 22, further comprising means for generating, by a language interpreter circuit, a response to the ASR result, the response including execution of a requested command associated with the ASR result.

Example 24 includes the subject matter of any of Examples 21-23, wherein the trend calculation further comprises means for calculating differences between time samples of the relative likelihood score and means for applying a low pass filter to a time sequence of the calculated differences.

Example 25 includes the subject matter of any of Examples 21-24, wherein the selected time period is chosen to provide a desired ASR error rate.

Example 26 includes the subject matter of any of Examples 21-25, wherein the complete-phrase hypotheses and the partial-phrase hypotheses are generated by a weighted finite state transducer (WFST) decoder.

Example 27 includes the subject matter of any of Examples 21-26, further comprising means for generating, by a neural network, acoustic scores of phonetic units of the speech, for use by the WFST decoder.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for reduced latency automatic speech recognition (ASR), the method comprising:
   generating, by a processor-based system, one or more complete-phrase hypotheses from a segment of speech, each complete-phrase hypothesis associated with a likelihood score;
   generating, by the processor-based system, one or more partial-phrase hypotheses from the segment of speech, each partial-phrase hypothesis associated with a likelihood score;
   selecting, by the processor-based system, one of the complete-phrase hypotheses associated with a highest of the complete-phrase hypotheses likelihood scores;
   selecting, by the processor-based system, one of the partial-phrase hypotheses associated with a highest of the partial-phrase hypotheses likelihood scores;
   calculating, by the processor-based system, a relative likelihood score based on a ratio of the likelihood score associated with the selected complete-phrase hypothesis to the likelihood score associated with the selected partial-phrase hypothesis;
   calculating, by the processor-based system, a trend of the relative likelihood score as a function of time; and
   identifying, by the processor-based system, an endpoint of the speech based on a determination that the trend does not decrease over a selected time period.

2. The method of claim 1, further comprising providing the selected complete-phrase hypothesis as an ASR result in response to identifying the endpoint of the speech.

3. The method of claim 2, further comprising generating, by a language interpreter circuit, a response to the ASR result, the response including execution of a requested command associated with the ASR result.

4. The method of claim 1, wherein the trend calculation further comprises calculating differences between time samples of the relative likelihood score and applying a low pass filter to a time sequence of the calculated differences.

5. The method of claim 1, wherein the selected time period is chosen to provide a desired ASR error rate.

6. The method of claim 1, wherein the complete-phrase hypotheses and the partial-phrase hypotheses are generated by a weighted finite state transducer (WFST) decoder.

7. The method of claim 6, further comprising generating, by a neural network, acoustic scores of phonetic units of the speech, for use by the WFST decoder.

8. A system for reduced latency automatic speech recognition (ASR), the system comprising:
   a weighted finite state transducer (WFST) decoder circuit to generate one or more complete-phrase hypotheses from a segment of speech, each complete-phrase hypothesis associated with a likelihood score;
   the WFST decoder circuit further to generate one or more partial-phrase hypotheses from the segment of speech, each partial-phrase hypothesis associated with a likelihood score;
   a relative likelihood score calculation circuit to select one of the complete-phrase hypotheses associated with a highest of the complete-phrase hypotheses likelihood scores, and to select one of the partial-phrase hypotheses associated with a highest of the partial-phrase hypotheses likelihood scores;

the relative likelihood score calculation circuit further to calculate a relative likelihood score based on a ratio of the likelihood score associated with the selected complete-phrase hypothesis to the likelihood score associated with the selected partial-phrase hypothesis;

a score trend calculation circuit to calculate a trend of the relative likelihood score as a function of time; and an endpoint decision circuit to identify an endpoint of the speech based on a determination that the trend does not decrease over a selected time period.

9. The system of claim 8, wherein the WFST decoder circuit is further to provide the selected complete-phrase hypothesis as an ASR result in response to the identification of the endpoint of the speech.

10. The system of claim 9, further comprising a language interpreter circuit to generate a response to the ASR result, the response including execution of a requested command associated with the ASR result.

11. The system of claim 8, wherein the trend calculation further comprises calculating differences between time samples of the relative likelihood score and applying a low pass filter to a time sequence of the calculated differences.

12. The system of claim 8, wherein the selected time period is chosen to provide a desired ASR error rate.

13. The system of claim 8, further comprising a neural network to generate acoustic scores of phonetic units of the speech for use by the WFST decoder.

14. At least one non-transitory computer readable storage medium having instructions encoded thereon that, when executed by one or more processors, result in the following operations for reduced latency automatic speech recognition (ASR), the operations comprising:

generating one or more complete-phrase hypotheses from a segment of speech, each complete-phrase hypothesis associated with a likelihood score;

generating one or more partial-phrase hypotheses from the segment of speech, each partial-phrase hypothesis associated with a likelihood score;

selecting one of the complete-phrase hypotheses associated with a highest of the complete-phrase hypotheses likelihood scores;

selecting one of the partial-phrase hypotheses associated with a highest of the partial-phrase hypotheses likelihood scores;

calculating a relative likelihood score based on a ratio of the likelihood score associated with the selected complete-phrase hypothesis to the likelihood score associated with the selected partial-phrase hypothesis;

calculating a trend of the relative likelihood score as a function of time; and identifying an endpoint of the speech based on a determination that the trend does not decrease over a selected time period.

15. The computer readable storage medium of claim 14, further comprising the operation of providing the selected complete-phrase hypothesis as an ASR result in response to identifying the endpoint of the speech.

16. The computer readable storage medium of claim 15, further comprising the operation of generating, by a language interpreter circuit, a response to the ASR result, the response including execution of a requested command associated with the ASR result.

17. The computer readable storage medium of claim 14, wherein the trend calculation further comprises the operations of calculating differences between time samples of the relative likelihood score and applying a low pass filter to a time sequence of the calculated differences.

18. The computer readable storage medium of claim 14, wherein the selected time period is chosen to provide a desired ASR error rate.

19. The computer readable storage medium of claim 14, wherein the complete-phrase hypotheses and the partial-phrase hypotheses are generated by a weighted finite state transducer (WFST) decoder.

20. The method of claim 19, further comprising the operation of generating, by a neural network, acoustic scores of phonetic units of the speech, for use by the WFST decoder.

* * * * *